United States Patent [19]

Yamashita et al.

[11] Patent Number: 4,568,911
[45] Date of Patent: Feb. 4, 1986

[54] METHOD AND DEVICE FOR OPTICAL D-A CONVERSION

[75] Inventors: Ysukasa Yamashita, Nara; Masaharu Matano, Kyoto; Kazuhiko Mori, Osaka; Nobuhisa Inoue, Kyoto, all of Japan

[73] Assignee: Omron Tateisi Electronics Co., Kyoto, Japan

[21] Appl. No.: 452,807
[22] Filed: Dec. 23, 1982

[30] Foreign Application Priority Data

| Dec. 29, 1981 | [JP] | Japan | 56-212437 |
| Feb. 23, 1982 | [JP] | Japan | 57-28277 |
| Feb. 24, 1982 | [JP] | Japan | 57-29573 |
| Feb. 24, 1982 | [JP] | Japan | 57-29574 |
| Feb. 25, 1982 | [JP] | Japan | 57-30168 |

[51] Int. Cl.$^4$ .................................. H03K 13/02
[52] U.S. Cl. .................................. 340/347 DA
[58] Field of Search ....... 340/347 DA, 347 M, 347 P; 350/96.12–96.14, 358

[56] References Cited

U.S. PATENT DOCUMENTS

| 3,655,261 | 4/1972 | Chang . | |
| 3,810,688 | 5/1974 | Ballman et al. . | |
| 3,874,782 | 4/1975 | Schmidt . | |
| 3,904,270 | 9/1975 | Cheo . | |
| 3,923,376 | 12/1975 | Martin . | |
| 3,990,780 | 11/1976 | Dakss | 350/96.13 |
| 4,000,937 | 1/1977 | Kaminow . | |
| 4,047,795 | 9/1977 | Hughes et al. . | |
| 4,092,060 | 5/1978 | Nunoshita et al. . | |
| 4,185,274 | 1/1980 | Giallorenzi | 340/347 M |
| 4,208,091 | 6/1980 | Cheo et al. . | |
| 4,217,036 | 8/1980 | Chang . | |
| 4,253,060 | 2/1981 | Chen . | |
| 4,264,125 | 4/1981 | Shibata . | |
| 4,280,755 | 7/1981 | McNaney . | |
| 4,297,704 | 10/1981 | Marom et al. | 350/96.13 |
| 4,325,603 | 4/1982 | Marom | 350/96.14 |
| 4,394,060 | 7/1983 | Verber et al. | 350/96.13 |
| 4,395,702 | 7/1983 | Gottlieb et al. | 340/347 M |
| 4,415,226 | 11/1983 | Verber et al. . | |
| 4,439,016 | 3/1984 | Ogland et al. . | |
| 4,470,661 | 9/1984 | Matsumoto | 350/96.13 |

FOREIGN PATENT DOCUMENTS 3025073 1/1982 Fed. Rep. of Germany .
3205868 2/1982 Fed. Rep. of Germany .
3201128 8/1982 Fed. Rep. of Germany .
821661 10/1959 United Kingdom .

OTHER PUBLICATIONS

"Fast Acousto-Optical Waveguide Modulators", Mannar L. Shah, *Applied Physics Letters*, vol. 23, No. 2, Jul. 1973.
"Programmable Optical Guided-Wave Device Using $Bi_{12}SiO_{20}$ Crystal", Hideki Hayashi, *IEEE Journal of Quantum Electronics*, vol. QE-14, No. 11, Nov. 1978, pp. 848–854.
"Temperature Stabilized Optical Waveguide Modulation" Makoto Minakata et al., *Review of the Electrical Communication Laboratories*, vol. 26, Nos. 9–10, Sep.-Oct. 1978, pp. 1139–1151.
"Electro-Optic Multiplexer for Large-Numerical Aperture, Low-Loss Fibers", Gravel et al., *Optics Letters*, vol. 1, No. 1.
"High-Performance Acousto-Optic Guided-Light Beam Device Using Two Tilting Surface Acoustic Waves", *Applied Physics Letters*, vol. 26, No. 4, pp. 140–142, Feb. 15, 1975, Tasi et al.
"Correlator Based on an Integrated Optical Spatial Light Modulator", *Applied Optics*, vol. 120, No. 9, May 1, 1981, pp. 1626–1629.
"Thermo-Optic Effect . . . Switching" Haruna et al., *Electronics Letters*, Oct. 29, 1981, vol. 17, No. 22, pp. 842–844.
"A Frequency-Multiplexing Light Source with Monolithically Integrated Distributed-Feedback Diode Lasers" by K. Aiki et al.

Primary Examiner—Vit W. Miska
Attorney, Agent, or Firm—Cushman, Darby & Cushman

[57] ABSTRACT

A surface acoustic wave generator is provided on an optical waveguide layer of an acousto-optical material. A group of parallel light beams each made significant according to the position of the path of propagation of light are made incident on the waveguide layer at an angle satisfying the Bragg diffraction condition with respect to a surface acoustic wave, and are successively diffracted by the wave, whereby a digital amount represented by the presence of light beams of the group is converted to an analog amount in terms of the power of light.

9 Claims, 19 Drawing Figures

METHOD AND DEVICE FOR OPTICAL D-A CONVERSION

BACKGROUND OF THE INVENTION

The present invention relates to a method of and a device for optical digital-analog (D-A) conversion by which digital optical data represented by a plurality of parallel incident light beams is converted to an analog amount in terms of optical power, and more particularly to a method of and a device for optical D-A conversion which utilize the Bragg diffraction of light by a surface acoustic wave.

With remarkable progress in light application techniques in recent years, there is a growing demand for various optical functional devices. Among other optical devices, optical D-A conversion devices can be used for light-wave communications, optical disks, photosensors, etc. Although greatly desired, such devices have not been actually used.

SUMMARY OF THE INVENTION

The main object of the invention is to provide a method of and a device for optical D-A conversion which can be used for the application of light.

The invention provides a method of optical D-A conversion which employs a surface acoustic wave (hereinafter referred to as "SAW") generating means provided on an optical waveguide layer of an acousto-optical material and which is characterized by making a group of parallel light beams each made significant according to the position of the path of propagation of light incident on the waveguide layer at an angle satisfying the Bragg diffraction condition with respect to a SAW, and diffracting the light beams with the SAW in succession to thereby convert a digital amount represented by the presence of light beams of the group to an analog amount in terms of power of light.

The invention further provides a device for optical D-A conversion which is characterized by an optical waveguide layer made of an acousto-optical material, and first and second means provided on the waveguide layer for generating two SAW's propagating in parallel with each other on the surface of the waveguide layer, so that a plurality of light beams incident on the waveguide layer at an angle satisfying the Bragg diffraction condition with respect to the SAW's and having different paths of propagation are successively diffracted by one of the SAW's and thereafter successively diffracted by the other SAW, to convert a digital amount represented by light beams incident in parallel on the waveguide layer and each made significant according to the position of incidence to an analog amount in terms of the power of light diffracted by one of the SAW's.

Examples of useful means for applying light beams to the optical waveguide layer and discharging them from the layer are grating, prism and other optical couplers. The SAW generating means is preferably an interdigital transducer (hereinafter referred to as "IDT"), but a Gunn diode or some other element is also usable.

The first and second means for generating the SAW's are so positioned that the plurality of incident light beams are successively diffracted by one of the SAW's and thereafter successively diffracted by the other SAW. Alternatively, means is provided for controlling the timing of generation of the two SAW's to diffract the beams as stated above.

The optical D-A conversion device of the invention can be fabricated on a single substrate, is very simple in construction and can therefore be manufactured easily in large quantities at a low cost. Further the device can be fabricated on a single substrate along with other optical functional elements in an integrated form. Further when the timing controlling means is provided, the SAW generating means can be arranged with increased freedom.

When at least two groups of light beams, which are different in at least one of the timing of incidence, position of incidence and direction of incidence, are made incident on the waveguide layer for optical D-A conversion, the components of the conversion device can be utilized effectively. This makes it possible to provide optically functional elements on a single substrate with an increased degree of integration.

The present invention further provides a device for optical D-A conversion which is characterized by an optical waveguide layer made of an acousto-optical material, means for generating a SAW for successively diffracting a plurality of parallel light beams propagating through a specified path in the waveguide layer, and optical switching means for permitting a plurality of incident light beams to propagate through the specified path in the waveguide layer upon switching, whereby a digital amount represented by light beams each made significant according to the position of propagation is converted to an analog amount in terms of the power of light discharged after propagating through the specified path or being diffracted.

Examples of the optical switching means are a row of a multiplicity of IDT's to which a d.c. voltage is applied, and a Y-shaped waveguide path having two branch paths extending at twice the Bragg angle $\theta$. Preferably the Y-shaped waveguide path is monolithically formed on a substrate on which the optical waveguide layer is formed, and the two branch paths thereof are optically coupled to the waveguide layer. Useful switching means include one for deflecting incident light, and one for controlling the passage of incident light, i.e., for blocking or passing the incident light.

Other features of the present invention will become more apparent from the following detailed description of the invention given with reference to the accompanying drawings.

DESCRIPTION OF THE PREFERRED EMBODIMENTS

Figure 1:
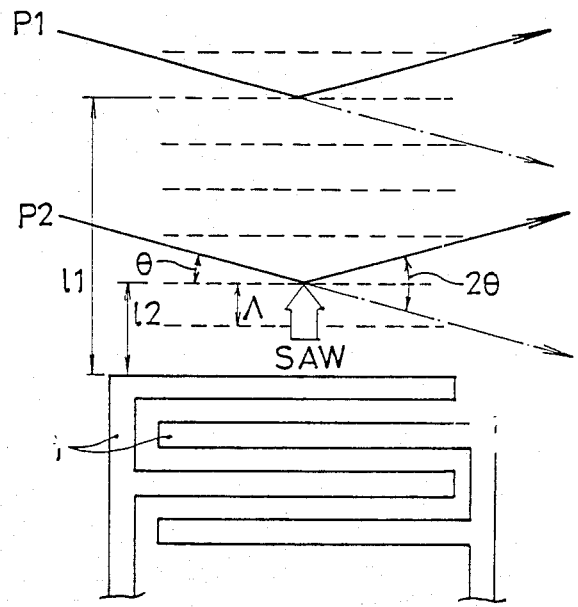
FIG. 1 and FIG. 2 show the principle of the present invention, FIG. 1 showing the mode of deflection of light beams, and FIG. 2 being a time chart showing the timings of deflection of the light beams.
Figure 2:
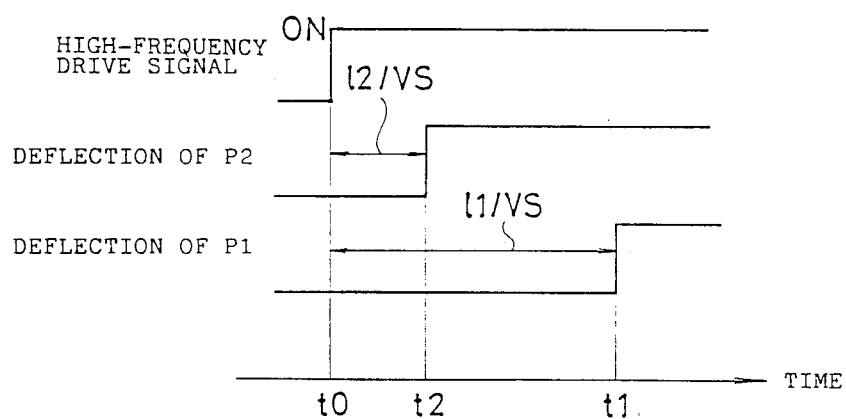

FIGS. 1 and 2 show the principle of the present invention, i.e., the deflection of light by the acousto-optical effect of a SAW. It is also seen that when two parallel beams of light intersect the SAW, the time when one of the light beams is deflected by the SAW differs from the time when the other beam is deflected by the SAW, by a period of time required for the SAW to propagate the spacing between the two beams.

With reference to FIG. 1, two parallel beams of light, which are independent of and separate from each other as indicated at P1 and P2, are incident on a planar optical waveguide layer made of an acousto-optical material. An IDT 1 is provided on the layer. When a high-frequency drive signal is applied to the IDT 1, the transducer produces a SAW indicated in parallel broken lines and providing periodically varying refractive indexes. The SAW travels on the surface of the waveguide at the velocity of propagation of sound. Since the SAW acts as a grating for diffracting light, the beams P1 and P2 incident on SAW at a small angle $\theta$ are completely reflected by the SAW and deflected through $2\theta$ when satisfying the following condition.

$$\sin \theta = (\lambda/2)\cdot(1/\Lambda) \quad (1)$$

where $\lambda$ is the wavelength of light and $\Lambda$ is the period of the SAW. The deflection of the beams is effected by the Bragg diffraction utilizing the SAW.

It is assumed that the drive signal is applied to the IDT 1 at time t0. The beam P2 is incident on the waveguide layer at a location closer to IDT 1 than the beam P1. Suppose the velocity of propagation of the SAW is VS, and the distances from the forward end of the IDT 1 to the positions where the beams P1 and P2 are deflected by the SAW, i.e., points of diffraction, are l1 and l2, respectively. The deflection of the beam P2 by the SAW is initiated at time t2 upon lapse of a period of time l2/VS from time t0. The deflection of the beam P1 is initiated at time t1 upon lapse of a longer period of time l1/VS from time t0. Thus the initiation of deflection of the beam P1 is later than that of the beam P2 by the period of time t1-t2 which is proportional to the spacing l1-l2 in the direction of propagation of the SAW. This is illustrated in FIG. 2.

Figure 3:
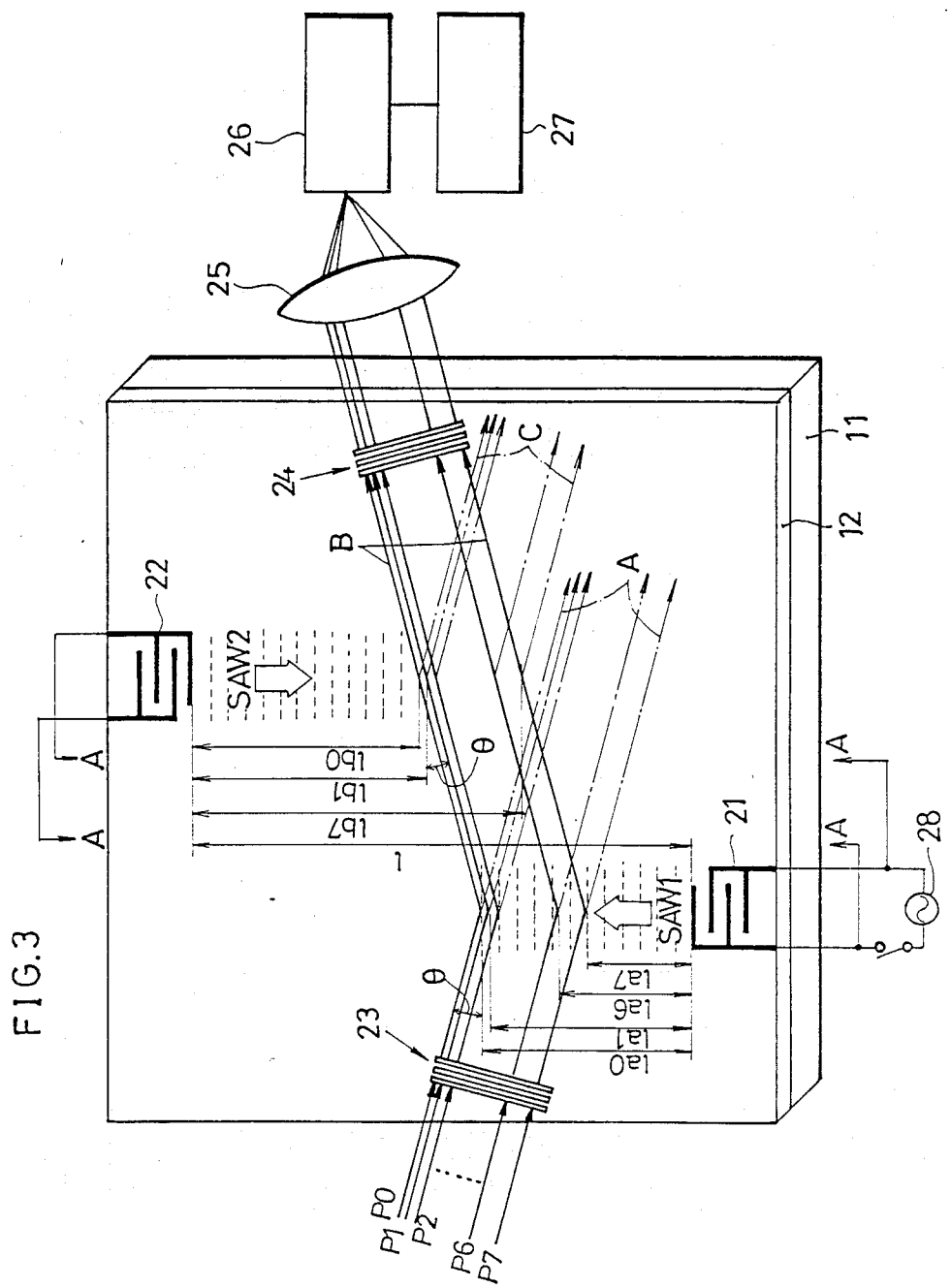
FIG. 3 to FIG. 5 show an embodiment of the invention, FIG. 3 being a perspective view showing a device for optical D-A conversion, FIG. 4 being a time chart showing light signals emitted from the conversion device, and FIG. 5 being a diagram showing the wave form of an output signal from a photosensor.
Figure 4:
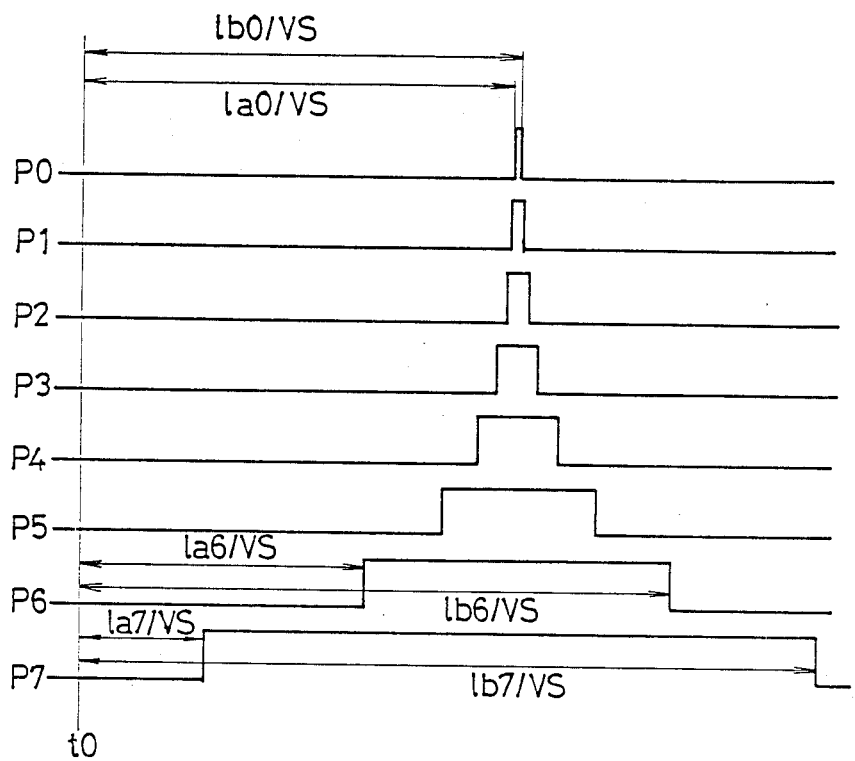
Figure 5:
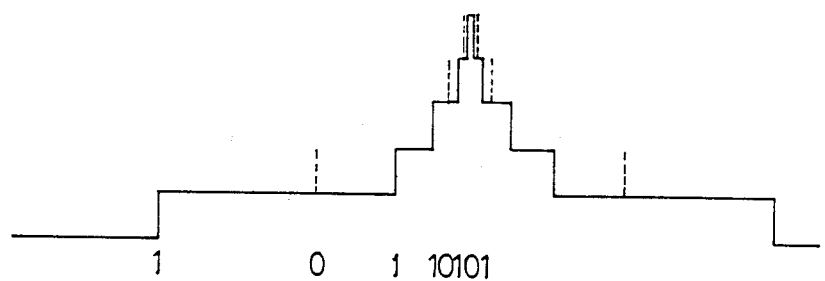

FIGS. 3 to 5 show an embodiment of the invention. FIG. 3 shows a substrate 11 of single crysal of lithium niobate ($LiNbO_3$), acousto-optical crystal, and a slab-type optical waveguide layer 12 formed over the surface of the substrate 11 by thermally diffusing titanium at a temperature of about 1000° C. The layer 12 is about several $\mu m$ in thickness and higher than the substrate 11 in refractive index by about $3-5 \times 10^{-3}$. Optical couplers 23 and 24 are provided at opposite ends of the waveguide layer 12. Eight separate parallel light beams P0 to P7 independent of one another are led into the layer 12 through the optical coupler 23. Of the light beams propagating in the waveguide layer 12, only those deflected by a SAW 1 but not deflected by a SAW 2 are discharged from the optical coupler 24 as will be described later. The beams discharged from the coupler 24 are converged by a lens 25 and fed to a photosensor 26, which in turn feeds an electric output to an integrator 27 for integration. The optical couplers 23 and 24 comprise grating couplers or prism couplers.

Provided on the optical waveguide 12 and opposed to each other on opposite sides of the path of travel of the beams P0 to P7 are an IDT 21 for producing a SAW 1 which intersects the beams P0 to P7 propagating in the layer 12 at an angle $\theta$ satisfying Equation (1), and an IDT 22 for producing a SAW 2 in parallel with the SAW 1 and propagating in a direction opposite to the SAW 1. Since the SAW's 1 and 2 are parallel, the light beam deflected by the SAW 1 also satisfies Equation (1) relative to the SAW 2. The IDT 22 is displaced from the IDT 21 by a suitable distance in the direction of propagation of the light beams. A high-frequency signal generator 28 applies high-frequency voltage signals to these IDT's 21 and 22.

It is assumed that the distance between the forward ends of the IDT's 21 and 22 is l, and that the distances between the forward end of the IDT 21 and the points of diffraction of the light beams P0, P1, ..., P6, P7 by the SAW 1 are la0, la1, ..., la6, la7, respectively. la0->la1> ... >la6>la7. Further it is assumed that the distances from the forward end of the IDT 22 to the points of diffraction of the light beams P0, P1, ..., P6, P7 by the SAW 2 after the deflection by the SAW 1 are lb0, lb1, ..., lb6, lb7, respectively. lb0<lb1< ... <lb6<lb7. Further la0 is smaller than lb0.

In the absence of SAW's 1 and 2, the beams P0 to P7 advancing from the optical coupler 23 travel straight as indicated at A. When a high-frequency signal is applied to the LDT's 21 and 22 at time t0 in this state, the beam P7 is deflected by the SAW 1 upon lapse of a period of time la7/VS from time t0. Since the SAW 2 has not reached the point of diffraction of the beam P7 at this time, the beam P7 deflected by the SAW 1 travels straight as indicated at B and strikes the optical coupler 24. Subsequently, upon lapse of a period of time la6/VS from time t0, the beam P6 is deflected by the SAW 1 and reaches the coupler 24. Similarly the beams P5, ..., P1 are deflected by the SAW 1 in succession. Finally upon lapse of a period of time la0/VS from time t0, the beam P0 is deflected by the SAW 1 and reaches the coupler 24.

Because lb0 is larger than la0 as already stated, lb0/VS is greater than la0/VS. Upon lapse of a period of time lb0/VS from time t0, i.e., a period of time (lb0-la0)/VS after the defelction of the beam P0 by the SAW 1, the SAW 2 reaches the point of diffraction of the beam P0, so that the beam P0 is deflected by the SAW 2 as indicated in a broken line C. The duration of incidence of the beam P0 on the coupler 24 is (lb0-la0)/VS. Similarly, the light beams P1, ..., P5, P6 deflected by the SAW 1 and indicated at B are successively deflected by the SAW 2. Finally the beam P7 is deflected by the SAW 2 a period of time (lb7-la7)/VS after it has been deflected by the SAW 1. The light beam Pi (i=0 to 7), when deflected by the SAW 2, no longer strikes the optical coupler 24. From the foregoing relation of the distances, $(lb0-la0)/VS<(lb1-la1)/VS< \ldots <(lb6-la6)/VS<(lb7-la7)/VS$. FIG. 4 shows the light beams Pi incident on the coupler 24.

The period of time T taken for the beam Ti to be deflected by SAW 2 after having been deflected by the SAW 1 is $T=(lbi-lai)/VS$ as mentioned above. Since the distance l between the IDT's 21 and 22 is approximately $lbi+lai$ and is constant, the time T is variable by altering the position of incidence of the light beam, i.e., distance lai. Thus the time T is controllable by varying the position of incidence of the light beam to control the power of light $Pd \cdot (lbi-lai)/Vs$ to be fed to the photosensor 26 via the coupler 24, if the power Pd of the light beam Pi is definite in respect of the time.

Accordingly as the distance la (collectively representing lai) increases with decreasing distance lb (similarly representing lbi), the power of light detected by the sensor 26 monotonously decreases. The power of light reduces to zero when la is l/2. Accordingly the light beam P0 at the largest distance la is given a significance of $2^0$ as the least significant bit (LSB), and the light beam P7 at the smallest distance la a significance of $2^7$ as the most significant bit (MSB). Similarly the other light beams Pi are given significances of $2^i$. To give such a significance, the distance (lb0-la0) for the beam P0 with LSB is expressed by $2^0 \cdot l0$ where l0 is a suitable unit distance, and the distance for each beam Pi, i.e., lbi-lai, is expressed by the following equation.

$$lbi-lai=2^i \cdot l0 \tag{2}$$

From Equation (2)

$$lai=\tfrac{1}{2}(l-2^i \cdot l0) \tag{3}$$

For example, if the distance l is 1 cm, and the distance l0 is 20 μm, the distances for the light beams are as follows.

| Pi | $2^i \cdot l0$ (μm) | lai (μm) |
|---|---|---|
| P0 | 20 | 4990 |
| P1 | 40 | 4980 |
| P2 | 80 | 4960 |
| P3 | 160 | 4920 |
| P4 | 320 | 4840 |
| P5 | 640 | 4680 |
| P6 | 1280 | 4360 |
| P7 | 2560 | 3720 |

It will be understood from the foregoing description that the light beams P0 to P7 represents an 8-bit binary number, with the beam P0 as LSB and the beam P7 as MSB and that a digital amount represented by these beams P0 to P7 is converted to an analog amount in terms of the light power detected by the photosensor 26 via the optical coupler 24. FIG. 5 shows the wave form of an output signal from the photosensor 26 detecting beams P0 to P7 representing a binary number 10110101. The output signal is integrated by the integrator 27 to eventually give an analog signal. In the drawing, 1 represents presence of a light beam, and 0 absence of a light beam.

While the light signals P0 to P7 are made significant in terms of a binary number in the foregoing embodiment, the light beam can of course be given a desired significance in accordance with the position of incidence. Further although the optical waveguide is formed by thermally diffusing titanium through LiNbO₃, such a waveguide can be prepared from other acousto-optical material by some other method.

Figure 6:
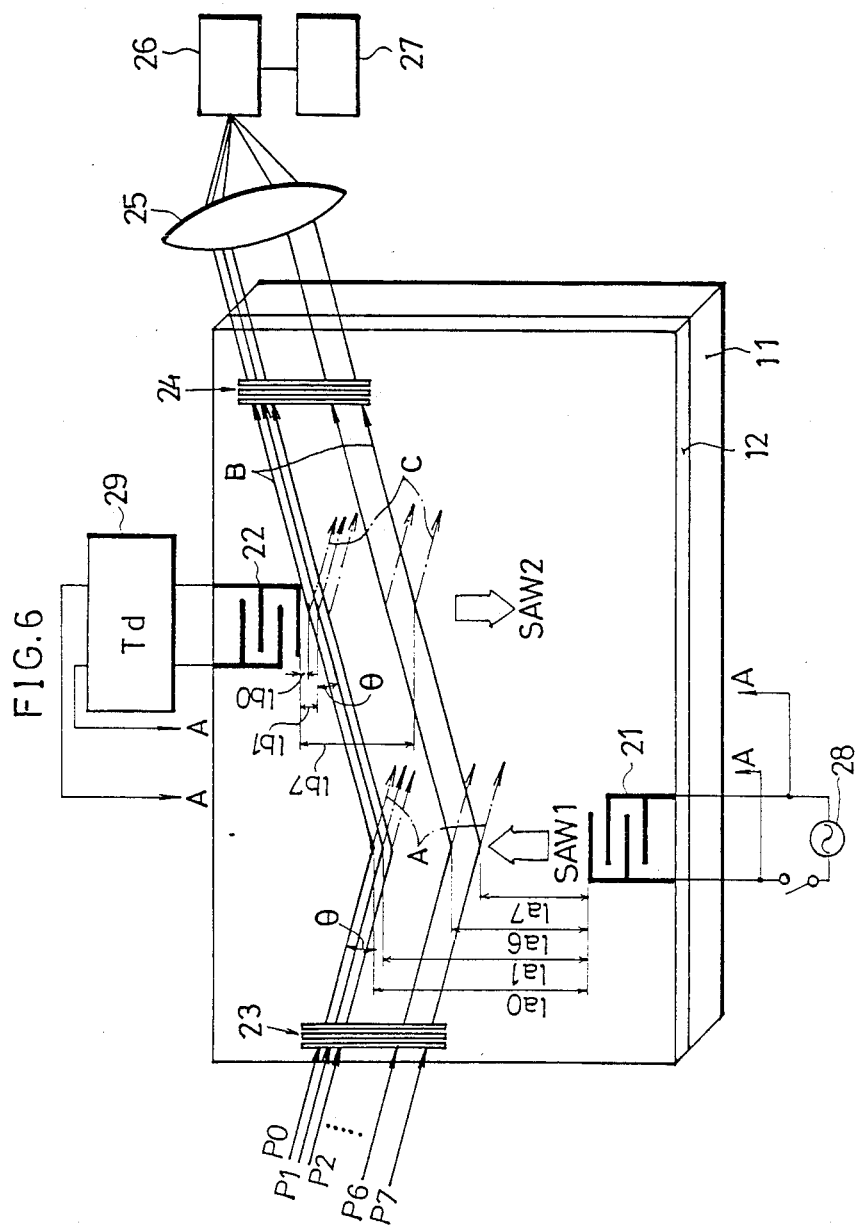
FIG. 6 is a perspective view showing a modification including a delay circuit.

While the IDT's 21 and 22 of the above embodiment are adapted to produce SAW's at the same time, the distance lbi can be made shorter if the SAW 2 is produced some time later than SAW 1. FIG. 6 shows such an embodiment, wherein the application of a high-frequency signal to an IDT 22 is delayed by a delay circuit 29 by a period of time Td, so that a SAW 2 is produced the period of time Td later than a SAW 1. Useful delay circuits include one which is adapted to delay the high-frequency signal itself, and a gate circuit which is adapted to open the gate with a time delay of Td.

For example, when the time delay Td is la0/VS, a light beam P0 will be deflected by the SAW 2 upon lapse of lb0/VS after having been deflected by the SAW 1. If the time delay Td is set to la0/VS+lb0/VS with use of lb0/VS, the distance (represented by lb0) between the forward end of the IDT 22 and the point of deflection of the light beam P0 by the SAW 2 after the deflection by the SAW 1 can be reduced to zero.

With reference to FIGS. 3 and 6, it will be readily understood that the distance la7 can also be reduced to zero.

Figure 7:
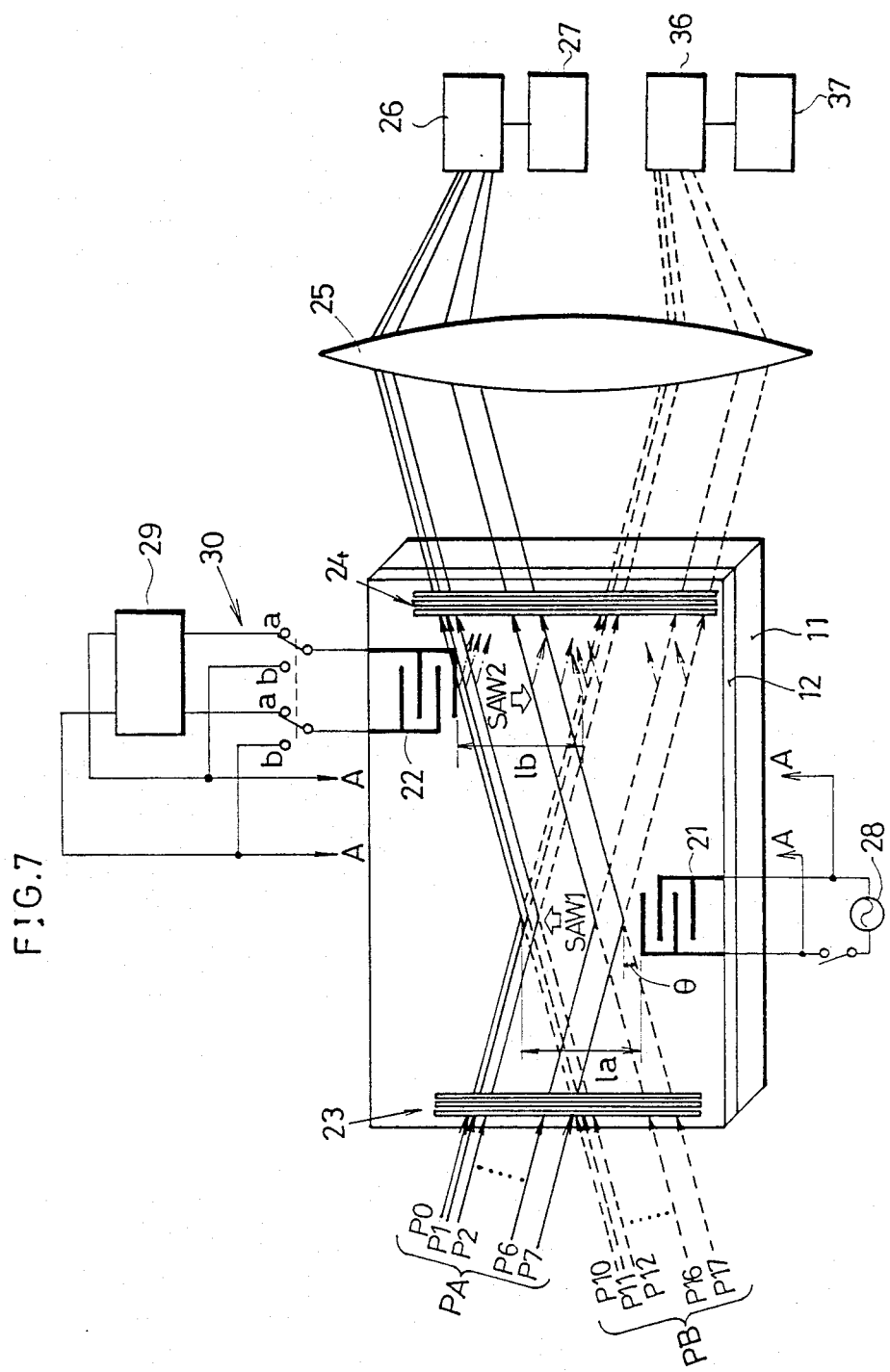
FIG. 7 is a perspective view showing an embodiment for processing two groups of light beams.

FIG. 7 shows another embodiment, i.e., a device for optical D-A conversion. In addition to a group PA of the same light beams P0 to P7 as above, a group PB of parallel light beams P10 to P17 similarly made significant according to positions of incidence are incident on the single device for optical D-A conversion. The group PA differs from the group PB in timing of D-A conversion. For the conversion of the group of beams PA, a change-over switch 30 is closed at a, and a SAW 2 is produced slightly later than a SAW 1, whereby the beams are subjected to optical D-A conversion exactly in the same manner as the group of beams shown in FIG. 6.

The group of beams PB are incident on an optical waveguide layer 12 at an angle different from the angle of incidence of the group of beams PA by 2θ so as to be deflected by the SAW 1 at the same points of deflection of the group PA by the SAW 1. Suppose the distance between the forward end of an IDT 21 and the point of diffraction of the beam P10 by the SAW 1 is la, and the distance between the forward end of an IDT 22 and the point of diffraction of the beam P10 by the SAW 2 after the diffraction by the SAW 1 is lb. lb is slightly larger than la. Accordingly the SAW's 1 and 2 can be produced at the same time with the switch 31 closed at b for the optical D-A conversion of the group of beams PB. The beams of the group PB are successively deflected by the SAW 1 first and detected by a photosensor 36 via an optical coupler 24 and a lens 25. Subsequently the beams are successively deflected by the SAW 2 and prevented from striking the sensor 36. The output of the sensor 36 is integrated by an integrator 37.

While either one of the groups PA and PB can be subjected to D-A conversion first, the production of the SAW's is temporarily suspended after the conversion of one of the groups. The other group is subjected to D-A conversion after the SAW's are no longer present in the path of propagation of the other group.

With the present embodiment, the two groups PA and PB are so incident on the device as to be symmetric with respect to a line through the couplers 23 and 24 along the direction of propagation of the light beams and also as to intersect each other on the path of travel of the SAW 1. Accordingly the groups PA and PB, when deflected by the SAW 1, are discharged in directions away from each other and can therefore be easily separated from each other after the optical D-A conversion. The embodiment also has the advantage that the position of the converging lens is easily adjustable.

When the IDT 21 is positioned closer to the optical path and la is much smaller than lb in FIG. 7, the device is so controlled that the SAW 1 is produced slightly later than the SAW 2 for the conversion of the group PB. Conversely if la is larger than lb, the SAW 2 is produced later than SAW 1 for the conversion of the group PB.

At least two groups of beams can be made incident on a single D-A conversion device in various modes except the one shown in FIG. 7, by varying the groups in at least one of the position of incidence, direction of incidence and timing of incidence. Some examples are shown in FIGS. 8 to 10.

Figure 8:
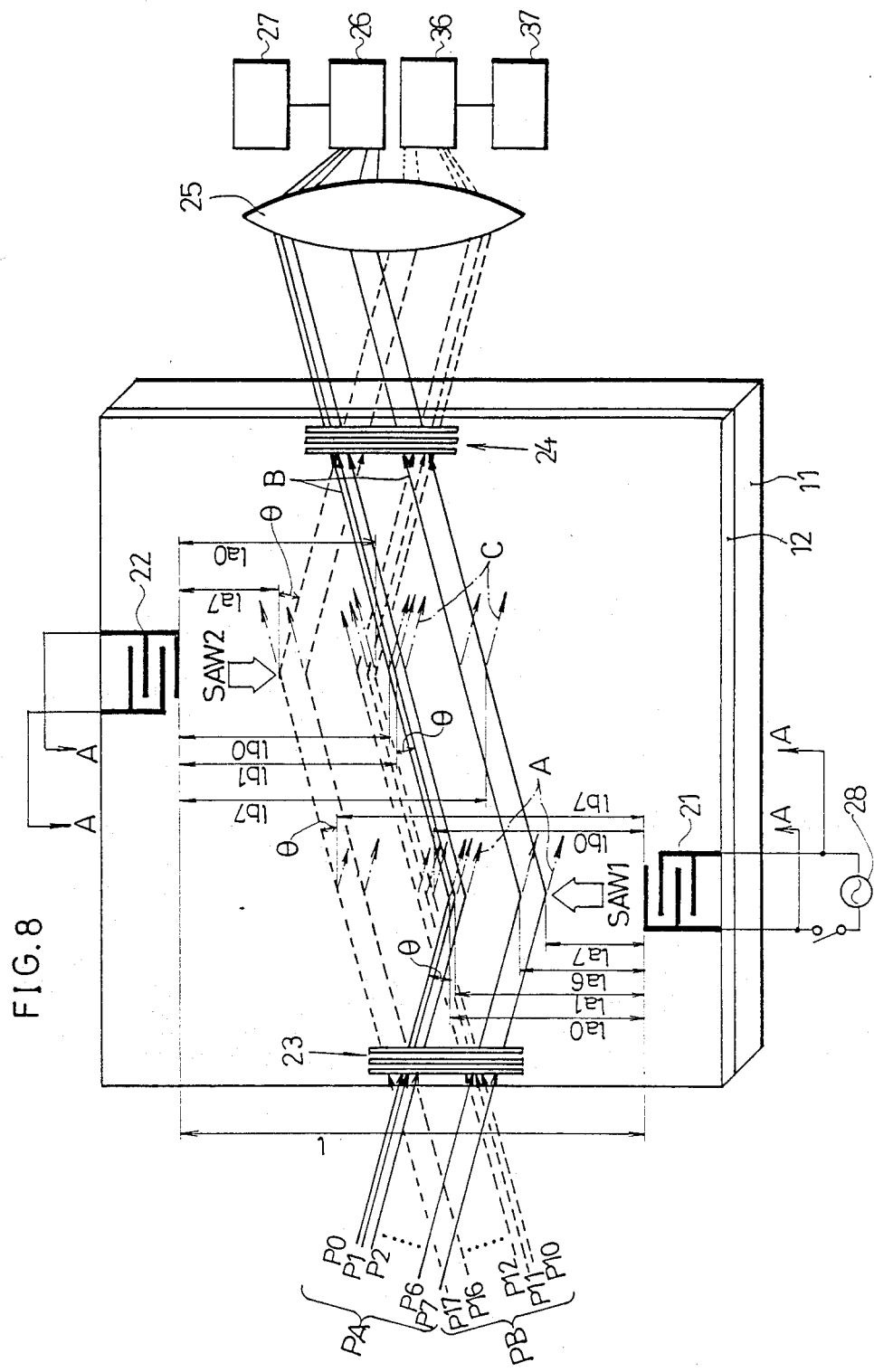
FIG. 8 to FIG. 10 show other embodiments also for processing two groups of light beams.

With reference to FIG. 8, IDT's 21 and 22 are in the same arrangement as those of FIG. 3, relative to a group of beams PA. If the group PA only is made incident on the device of FIG. 3, about one half of an optical waveguide layer 12 remains unused. For the effective use of the waveguide layer 12, a group PB of eight parallel light beams P10 to P17 made significant according to the position of incidence like the group PA are made incident on the waveguide layer 12 almost at the same position as the group PA at an angle different from the group PA by $2\theta$. The distances between the forward end of an IDT 21 and the points of diffraction of the beams P10, . . . , P17 by a SAW 1 are lb0, . . . , lb7, respectively, and the distance between the forward end of an IDT 22 and the points of diffraction of the beams P10, . . . , P17 by a SAW 2 are la0, . . . , la7, respectively. The beams of the group PB are successively deflected by the SAW 2 first and impinge on a photosensor 36 via an optical coupler 24. The output of the sensor 36 is integrated by an integrator 37. After the deflection by the SAW 2, the beams of the group PB are successively deflected by the SAW 1 and inhibited from striking the coupler 24. It will be understood that the digital data represented by the group of beams PB is converted to analog data in terms of an optical power fed to the coupler 24 exactly in the same manner as already described. Although the distance la7 is shown in FIGS. 3 and 8 as a suitable distance for convenience of illustration, the distance can of course be reduced to zero.

The embodiment shown in FIG. 8 has the advantage that the two groups of beams PA and PB can be made incident on the device at the same time for simultaneous optical D-A conversion. Accordingly the time taken for the optical D-A conversion of large number of items of optical digital data can be shortened by one half. Further it is possible to check whether the conversion is effected properly by feeding two identical groups of beams as the groups PA and PB at the same time and comparing the items of analog data obtained by conversion.

Figure 9:
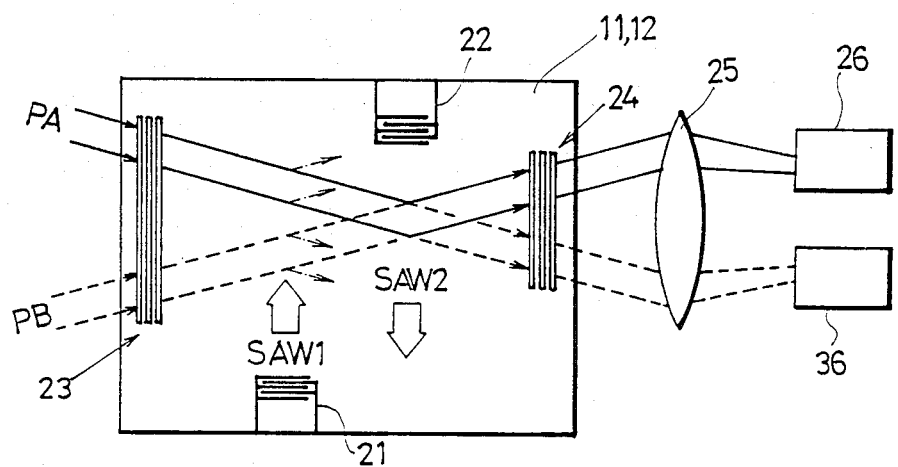
Figure 10:
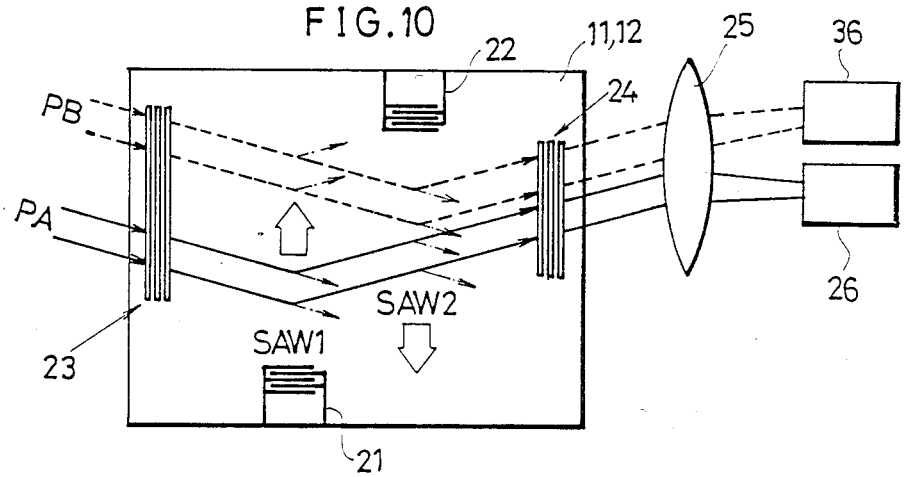

With the embodiment shown in FIG. 9, groups of beams PA and PB are incident on its waveguide layer so as to be symmetrical with respect to the direction of travel of the light and to intersect each other on the path of propagation of a SAW 2. Both the groups PA and PB are deflected first by the SAW 2 and thereafter by a SAW 1. For the optical D-A conversion of the group of beams PB, the SAW's 1 and 2 are generated at the same time as in the embodiment of FIG. 8. For the conversion of the group PA, the SAW 2 are produced slightly later than the SAW 1.

With reference to FIG. 10, groups of beams PA and PB in parallel with each other are incident on the device at different positions. The group beams PA are successively deflected first by a SAW 1 and then by a SAW 2, the SAW's being generated at the same time as in the embodiment of FIG. 8. For the conversion of the group of beams PB, the SAW 2 is generated slightly later than the SAW 1, and the beams are deflected first by the SAW 2 and then by the SAW 1.

Although the IDT's 21 and 22 are so arranged as to produce SAW's propagating in opposite directions in any of the foregoing embodiments, the transducers may be arranged to produce SAW's propagating in the same directions.

Figure 11:
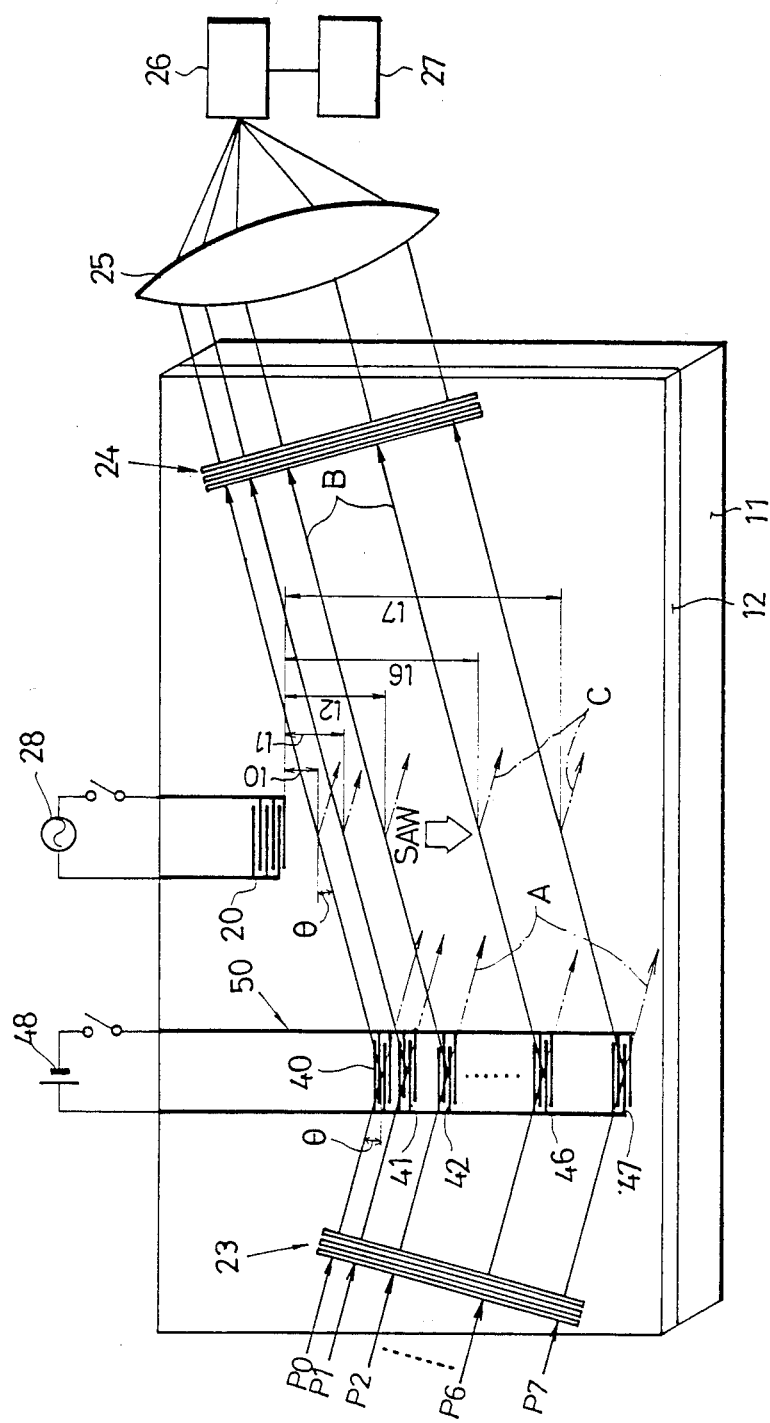
FIG. 11 to FIG. 13 show another embodiment, FIG. 11 being a perspective view showing an optical D-A conversion device, FIG. 12 being a time chart showing output optical signals, and FIG. 13 being a diagram showing the wave form of a detecting signal.
Figure 12:
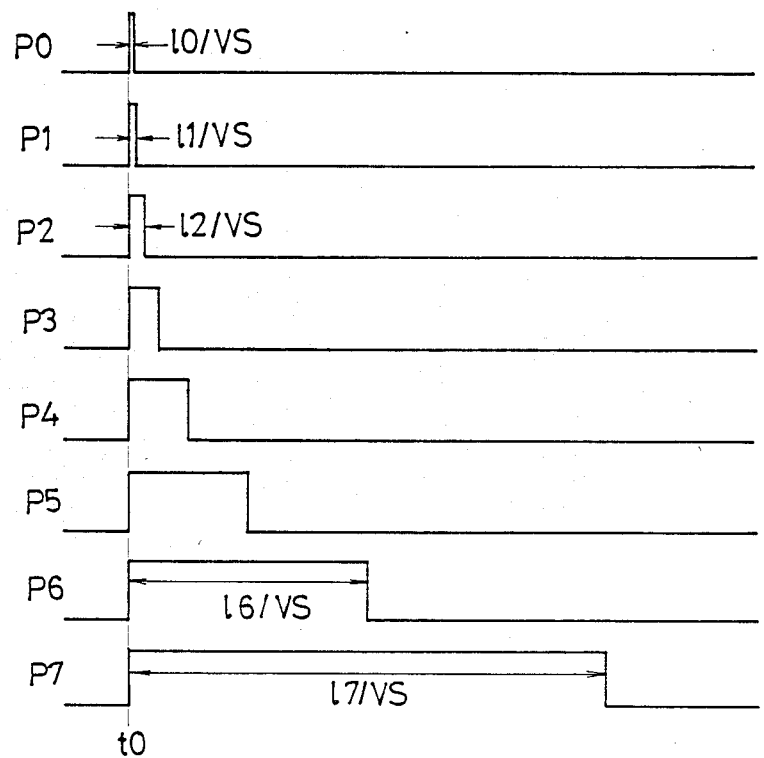
Figure 13:
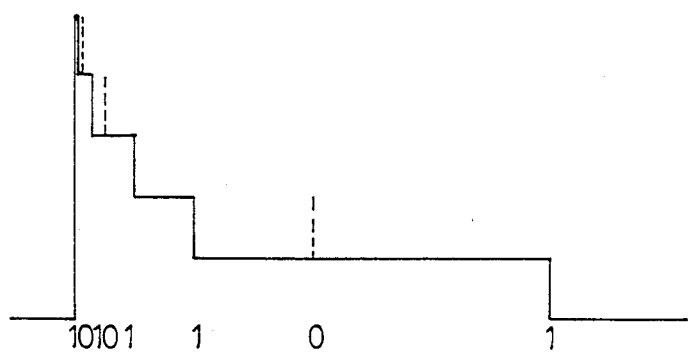

FIGS. 11 to 13 show another embodiment. With reference to FIG. 11, IDT's 40 to 47 are arranged in a row on an optical waveguide layer 12 toward one side thereof, at positions where the transducers intersect incident light beams P0 to P7. The electrodes of the IDT's 40 to 47 are arranged at a spacing satisfying the period $\Lambda$ of Equation (1) and intersect the beams P0 to P7 at an angle $\theta$. The IDT's are connected together to provide a row of IDT's, 50. When a d.c. voltage is applied to the row 50 by a d.c. power supply 48, periodically varying refractive indexes are produced immediately below each IDT by an electro-opticaly effect to provide a diffraction grating for each of the beams P0 to P7. Accordingly when the d.c. voltage is applied to the row of IDT's 50 at time t0, the beams P0 to P7 travelling straight as indicated at A are deflected through $2\theta$ by the Bragg diffraction as indicated at B.

The waveguide layer 12 is provided thereon with an IDT 20 positioned toward the beam discharging side thereof from the row 50 for producing a SAW intersecting the beams P0 to P7 at an angle $\theta$ satisfying Equation (1) after these beams have been deflected by the row 50. A high-frequency signal generator 28 applies a high-frequency voltage signal to the IDT 20 at time t0. Since the SAW produced by the IDT 20 has not reached the path of travel of any beam at the time t0, the beams P0 to P7 are incident on an optical coupler 24 and detected by a sensor 26 via a lens 25. Upon the lapse of a period of time l0/VS from time t0, the SAW reaches the point of diffraction of the beam P0 to diffract the beam P0 as indicated at C. The duration of incidence of the beam P0 on the coupler 24 is l0/VS. Similarly the light beams P1, . . . , P6 (B) are successively deflected by the SAW. Finally, upon the lapse of a period of time l7/VS from time t0, the beam P7 is deflected by the SAW. When deflected by the SAW, the light beams Pi (i=0 to 7) are no longer incident on the coupler 24. FIG. 12 shows the light signals Pi incident on the coupler 24.

Since the time T taken for the light beam Pi to be deflected by the SAW after having been deflected by the row of IDT's 50 is li/VS, the time T is variable by altering the position of incidence of the beam, i.e., the distance l1. In this embodiment also, therefore, the time T is controllable by varying the position of incidence of the light beam to control the power of light Pd·li/VS to be fed to the photosensor 26 via the coupler 24, if the power Pd of the light beam Pi is definite in respect of the time. It will be understood that a digital amount represented by a plurality of light beams made significant in accordance with the position of propagation is converted to an analog amount in terms of the light power detected by the photosensor 26 via the coupler 24. FIG. 13 shows the wave form of an output signal from the photosensor 26 produced in response to beams P0 to P7 representing a binary number 10110101. The output signal is integrated by an integrator 27 to give an electric analog signal.

Although d.c. voltage is applied to the row 50 simultaneously with the application of a high-frequency signal to the IDT 20 in the above embodiment, the row 50 may be driven with a slight time delay after driving the IDT 20, whereby the distance l0 can be set to a longer value. The reverse is also possible. Further by controlling the timing with which the IDT row 50 and IDT 20 are driven, the light beams A, not deflected by the row 50, can be subjected to D-A conversion by the SAW, in addition to or in place of the light beam B deflected by the row 50. In addition to or in place of the light beams P0 to P7, it is possible to make another group of beams incident at an angle different from the beams P0 to P7 by $2\theta$ to subject them to optical D-A conversion.

Figure 14:
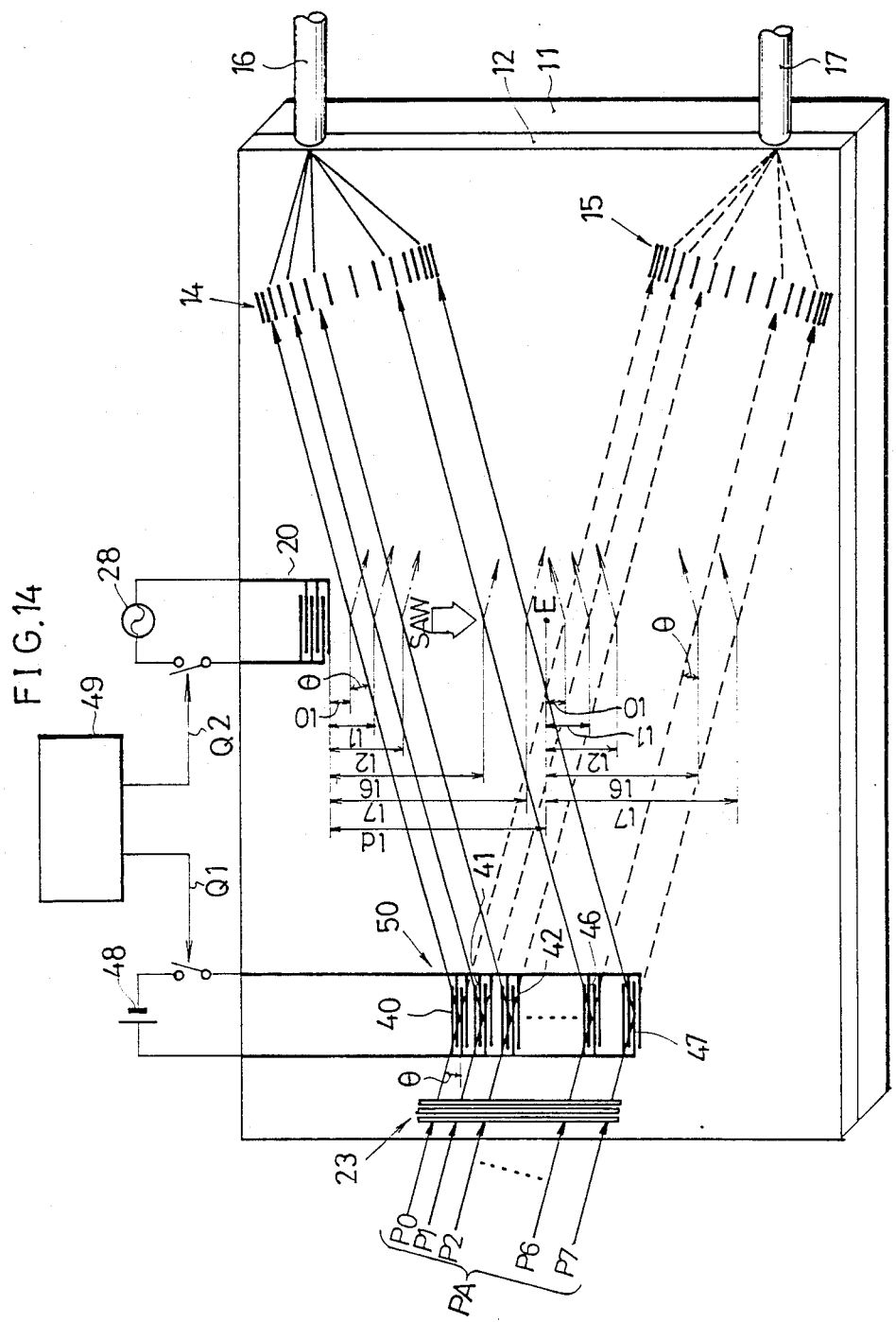
FIG. 14 and FIG. 15 show a modification of the embodiment of FIG. 11, FIG. 14 being a perspective view of an optical D-A conversion device, and FIG. 15 being a time chart showing output signals.
Figure 15:
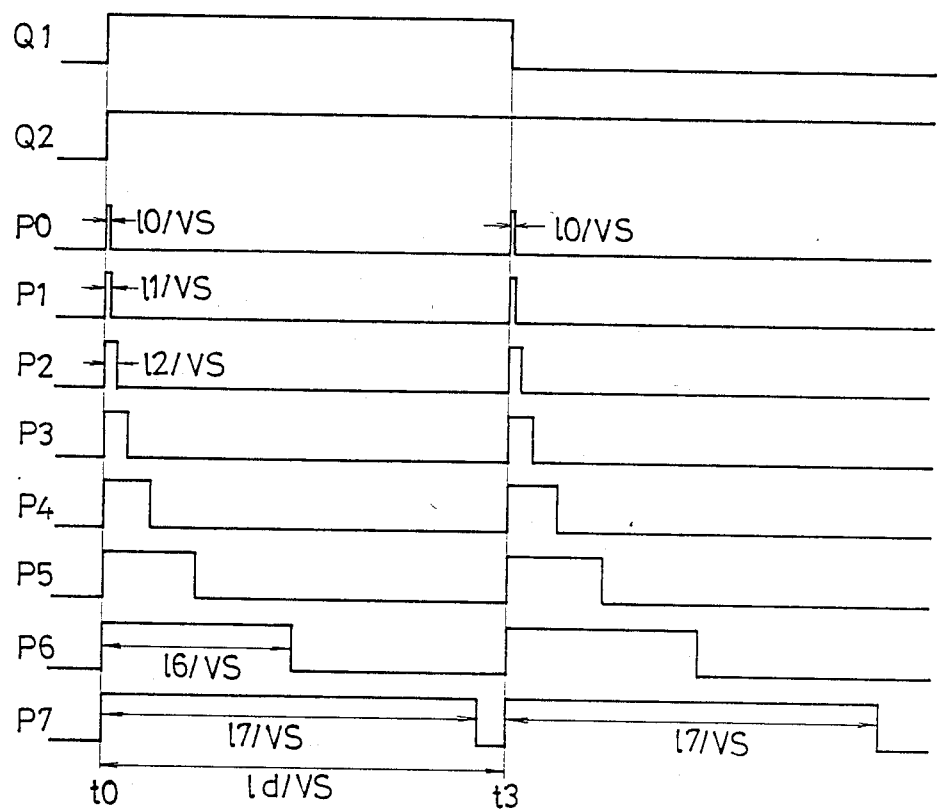

FIGS. 14 and 15 show an embodiment wherein a group of beams PA are subjected to optical D-A conversion two times. With reference to FIG. 14, a timing control circuit 49 emits signals Q1 and Q2 for effecting and discontinuing application of a d.c. voltage to a row of IDT's 50, and for effecting and discontinuing application of a high-frequency voltage signal to an IDT 20 (see also FIG. 15). When the signal Q1 is emitted at time t0 to apply the d.c. voltage to the row 50, the group of beams PA travelling straight as indicated in broken lines are deflected through $2\theta$ by the Bragg diffraction and led into an optical fiber 16 via a grating lens 14. Further the high-frequency signal is fed to the IDT 20 in response to the signal Q2 at time t0, causing the IDT 20 to generate a SAW. The group of beams PA are successively deflected by the SAW and inhibited from entering the fiber 16 as already stated.

The SAW generated from the IDT 20 further propagates on the optical waveguide 12 with the lapse of time. At suitable time t3 after the deflection of the beam P7, the emission of the signal Q1 is discontinued to stop the application of the d.c. voltage to the row 50. The generation of SAW may be continued or suspended. The group of beams PA then travel straight again as indicated in broken lines and enter an optical fiber 17 via a grating lens 15. The beams PA thus travelling straight also satisfy Equation (1) with respect to the SAW. It is now assumed that a point at a distance of l0 from the point of diffraction of the straight beam P0 by the SAW toward the IDT 20 is E, and the distance between the point E and the forward end of IDT 20 is ld. The above-mentioned time t3 is to satisfy the relation of $t3-t0=ld/VS>l7/VS$.

It therefore follows that after time t3, the straight beams P0 to P7 are successively diffracted by the SAW and deflected from the path of incidence on the lens 15 as in the foregoing case. Accordingly the light incident on the optical fiber 17 through the lens 15 after time t3 has exactly the same wave form as the light incident on the optical fiber 16 through the lens 14. Thus the group of beams PA are subjected to optical D-A conversion two times.

Although the group of beams PA, if incident on the waveguide layer 12 before time t0, will be incident on the optical fiber 17 through the lens 15, the beams incident on the fiber 17 after time t3 only can be separated off easily with a suitable optical switch provided on the layer 12, or by making the beams PA incident at time t0, or with an optical switch provided for the optical fiber 17.

The present embodiment is especially suitable for subjecting a group of optical digital signals to optical D-A conversion into two groups of optical analog signals for use. For example, the optical analog signals delivered from the two optical fibers 16 and 17 can be compared for checking the D-A conversion process.

Figure 16:
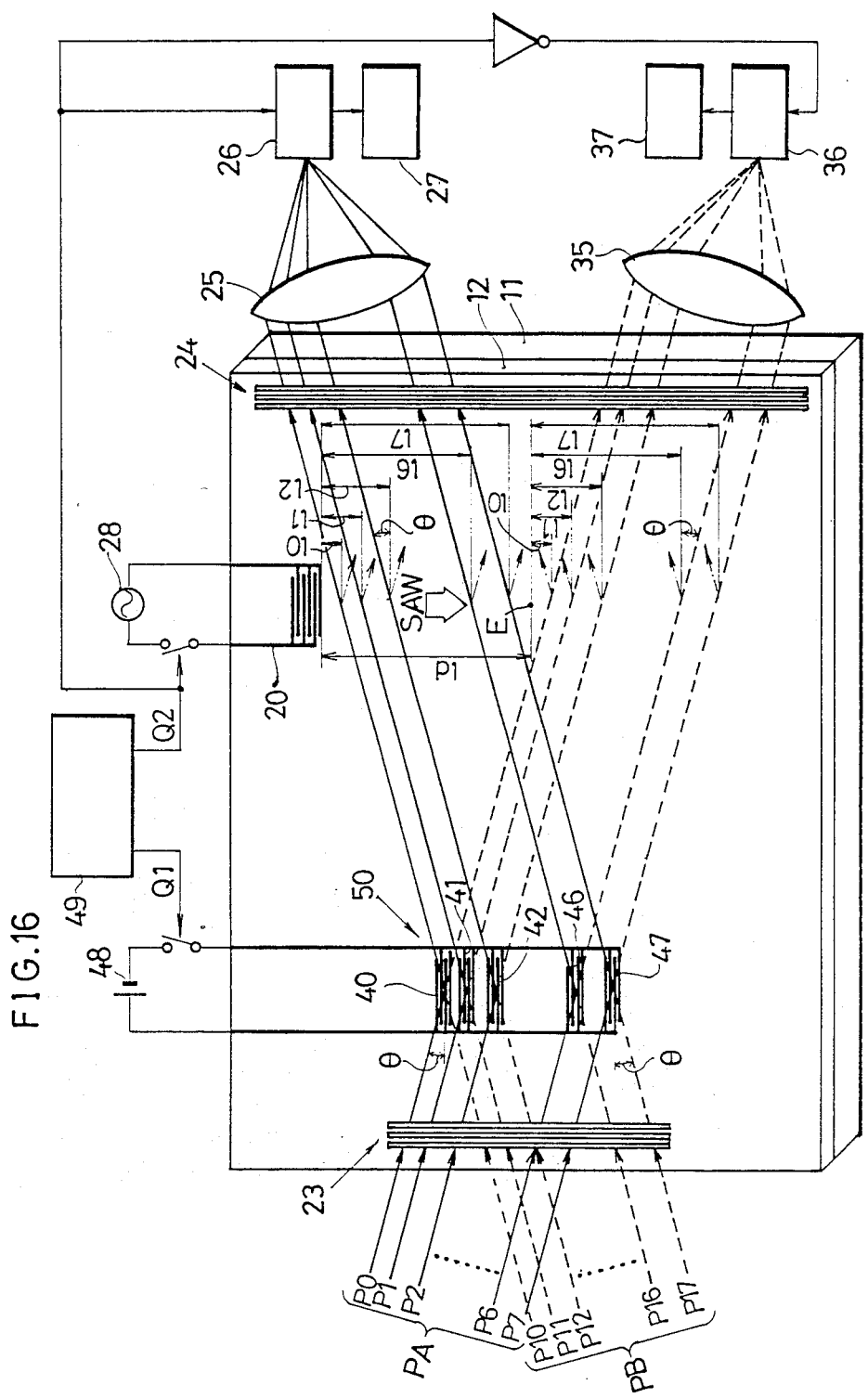
FIG. 16 and FIG. 17 show still another embodiment, FIG. 16 being a perspective view showing an optical D-A conversion device, and FIG. 17 being a time chart.
Figure 17:
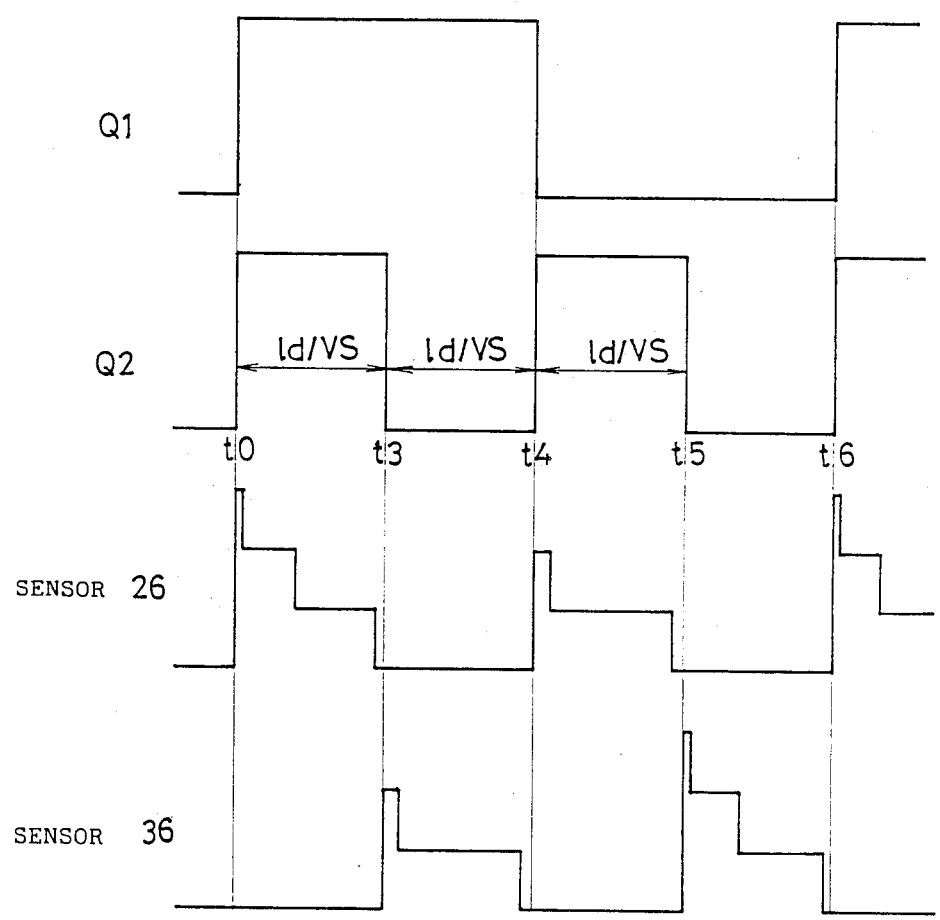

FIGS. 16 and 17 show another embodiment. With reference to FIG. 16, in addition to the same group of beams PA as already stated, another group PB of parallel beams P10 to P17 made significant according to their positions like the group PA are incident through an optical coupler 23 on an optical waveguide 12 at an angle different from the angle of incidence of the group PA by $2\theta$ to intersect the group of beams PA on a row of IDT's 50. The beams subjected to optical D-A conversion are discharged through an optical coupler 24 and impinge on photosensors 26, 36 through lenses 25, 35. The electric output signals from the sensors 26, 36 are integrated by integrators 27, 37. Both the photosensors 26, 36 are controlled by a signal Q2. The sensor 26 detects the incidents light beams when the signal Q2 is at H level, while the sensor 36 detects the beams incident thereon when the signal Q2 is at L level.

The control signals Q1 and Q2 emitted by by a timing control circuit 49 differ from those shown in FIGS. 14 and 15. With reference to FIG. 17, it is assumed that both groups of beams PA and PB are incident on the optical waveguide layer 12. At time t0, a d.c. voltage is applied to the row of IDT's 50, and a high-frequency signal to an IDT 20. The groups of incident beams PA and PB are deflected by the row 50 through $2\theta$. Consequently, the beams of group PA are first successively deflected by a SAW generated from the IDT 20 and thereby subjected to optical D-A conversion, and the beams before the deflection are detected by the sensor 26. At time t3 a period of time ld/VS after the time t0, the signal Q2 is changed from H level to L level, whereupon the production of the SAW from the IDT 20 is suspended. However, the SAW generated during the period of time t0 to time t3 further propagates, so that the group of beams PB are subjected to optical D-A conversion by the SAW and are detected by the sensor 36.

At time t4 after the beam P17 of MSB in the group PB has been deflected, the signal Q1 is inverted to L level, and the signal Q2 to H level. Consequently no d.c. voltage is applied to the row 50 after time t4, with the result that the beams of groups PA and PB travel straight without being deflected by the row 50. Accordingly the group of beams PB are deflected first by the SAW generated by the IDT 20 and thereby subjected to D-A conversion. The beams are detected by the sensor 26. While the signal Q2 is inverted to L level at time t5 a period of time ld/VS after time t4, the group of beams PA are subjected to D-A conversion by the SAW already generated and propagating, and the light is detected by the sensor 36.

With the present embodiment, the signal is inverted to L level upon completion of D-A conversion of one group of beams by the SAW, and the generation of the SAW is suspended. The other group of beams are then subjected to D-A conversion by the SAW already produced and advancing. Thus no SAW is present on the paths of travel of the two groups of beams when the other group of beams are completely subjected to conversion, so that the subsequent conversion can be conducted immediately. This serves to shorten the period of repetition of D-A conversion.

Figure 18:
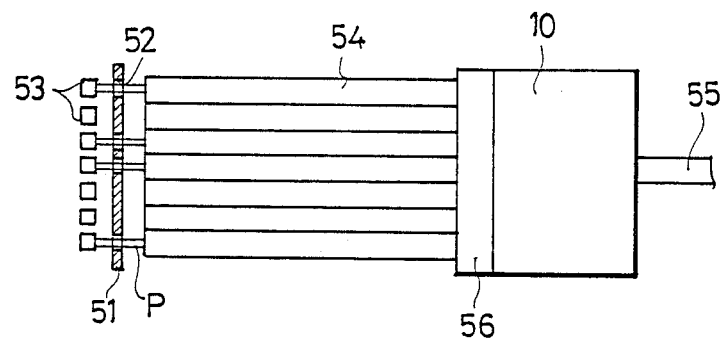
FIG. 18 and FIG. 19 are diagrams showing applications of the optical D-A conversion device of the invention.

The optical D-A conversion device of this invention is useful for various applications. FIG. 18 shows the present device as used for a punched card reader. A card 51 is formed with holes 52 made significant according to a predetermined rule and representing data. Beams P from a laser array 53 pass through the holes 52 in the card 51 and through handle fibers 54 and are fed to an optical D-A conversion device 10 via an optical connector 56. The optical signal resulting from D-A conversion is emitted via an optical fiber 55.

Figure 19:
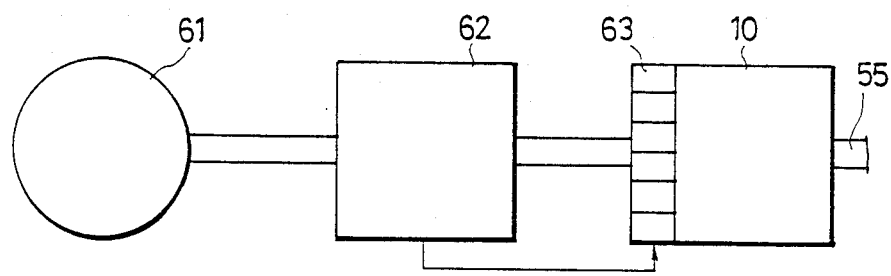

FIG. 19 shows a reader-processor for audio-optical disks. A series of optical signals read from an audio-optical disk 61 are converted to electric signals by an optoelectric conversion unit 62 in the form of parallel data, and the data is stored in a shift register. Based on the data stored in the shift register, a laser array 63 emits laser beams made significant according to positions of incidence, and the beams are fed to an optical D-A conversion device 10. The optical signals resulting from D-A conversion are delivered via an optical fiber 55.

What is claimed is:

1. A metod of optical D-A conversion with use of surface acoustic wave generating means provided on an optical waveguide layer of an acousto-optical material, comprising making a group of parallel light beams each made significant according to the position of the path of propagation of light incident on the waveguide layer at an angle satisfying the Bragg diffraction condition with respect to a surface acoustic wave, and diffracting the light beams with the surface acoustic wave in succession to thereby convert a digital amount represented by the presence of the light beams of the group to an analog amount in terms of an optical power.

2. A method as defined in claim 1 wherein at least two groups of light beams are made incident on the waveguide layer, the two groups being different in at least one of the timing of incidence, position of incidence and direction of incidence.

3. A device for optical digital-to-analog conversion of a digital value represented by a plurality of parallel light beams to an analog value indicated by the power of light comprising;
   an optical waveguide layer made of an acousto-optical material;
   means for propagating plural light beams, each encoding a different bit of a digital value, through the waveguide layer at predetermined relative positions depending upon the relative significance of said encoded bits;
   first and second means provided on the waveguide layer for generating two surface acoustic waves propagating in parallel to one another on the surface of the waveguide layer and for causing said propagating waves to intersect with the propagating light beams at an angle satisfying the Bragg diffraction condition to selectively diffract same; and
   means for receiving light beams diffracted by one of the surface acoustic waves, said received light beams representing the analog value equivalent to the digital value encoded by the plural light beams.

4. A device as defined in claim 3 wherein the first and second means for generating the surface acoustic waves are so positioned that the plurality of propagating light beams are successively diffracted by one of the surface acoustic waves and thereafter successively diffracted by the other surface acoustic wave.

5. A device as defined in claim 3 further comprising means for controlling the timing of generation of the two surface acoustic waves so that the plurality of propagating light beams are successively diffracted by one of the surface acoustic waves and thereafter successively diffracted by the other surface acoustic wave.

6. A device for optical digital-to-analog conversion of a digital value represented by a plurality of parallel light beams to an analog value indicated by the power of light comprising:
   an optical waveguide layer comprising an acousto-optical material;
   means for generating a surface acoustic wave and for propagating said wave along a predetermined path on the waveguide layer;
   means for propagating plural light beams together encoding a digital value through the waveguide layer in a predetermined direction, said propagating light beams intersecting with the propagating surface acoustic wave at an angle satisfying the Bragg diffraction condition, said propagating means propagating said plural light beams at relative positions determined by a desired relative significance of said plural beams;
   optical switching means for selectively permitting a plurality of incident light beams to traverse the predetermined path in the waveguide layer; and
   means for receiving one of (a) the light beams diffracted by the surface acoustic wave and (b) the nondiffracted light beams traversing the predetermined path, said received light beams representing the analog value equivalent to the digital value encoded by the light beams.

7. A device defined in claim 6 wherein the switching means alternately permits and interrupts the propagation of the light beams through the specified path.

8. A device as defined in claim 6 wherein the switching means changes the path of propagation of the light beams toward one of two specified directions.

9. A device as defined in claim 6 wherein:
   said generating means generates and propagates plural acoustic waves; and
   said device further comprises means for controlling the timing of the switching by the switching means and the generation of the plural surface acoustic waves relative to each other.

* * * * *

UNITED STATES PATENT AND TRADEMARK OFFICE
CERTIFICATE OF CORRECTION

PATENT NO.   :   4,568,911
DATED        :   February 4, 1986
INVENTOR(S)  :   YAMASHITA, ET AL It is certified that error appears in the above-identified patent and that said Letters Patent is hereby corrected as shown below:

Change one of the inventor's name from "Ysukasa Yamashita" to --Tsukasa Yamashita--.

Signed and Sealed this

Fourteenth Day of April, 1987

Attest:

DONALD J. QUIGG

*Attesting Officer*         *Commissioner of Patents and Trademarks*